(12) United States Patent
Saito et al.

(10) Patent No.: US 7,033,531 B2
(45) Date of Patent: Apr. 25, 2006

(54) PROCESS OF MAKING A FLEXIBLE RESIN BOOT

(75) Inventors: Katsushi Saito, Osaka (JP); Mayuki Toriumi, Osaka (JP); Hiroshi Ohno, Osaka (JP); Hitoshi Ueno, Shiga (JP)

(73) Assignees: Toyo Tire & Rubber Co., Ltd., Osaka (JP); Toyo Boseki Kabushiki Kaisha, Osaka (JP)

( * ) Notice: Subject to any disclaimer, the term of this patent is extended or adjusted under 35 U.S.C. 154(b) by 366 days.

(21) Appl. No.: 10/290,407

(22) Filed: Nov. 7, 2002

(65) Prior Publication Data

US 2003/0137078 A1 Jul. 24, 2003

Related U.S. Application Data

(60) Division of application No. 09/903,361, filed on Jul. 11, 2001, now abandoned, which is a continuation-in-part of application No. PCT/JP00/05238, filed on Aug. 3, 2000.

(30) Foreign Application Priority Data

| Aug. 6, 1999 | (JP) | ................................... 11-223732 |
| Nov. 4, 1999 | (JP) | ................................... 11-313676 |
| Dec. 28, 1999 | (JP) | ................................... 11-373377 |
| May 11, 2000 | (JP) | ................................... 2000-138903 |

(51) Int. Cl.
 B29C 45/00 (2006.01)
 B29C 47/00 (2006.01)

(52) U.S. Cl. .................................... 264/211; 264/328.1
(58) Field of Classification Search ............... 264/211, 264/328.1, 523
 See application file for complete search history.

(56) References Cited

U.S. PATENT DOCUMENTS 5,550,190 A * 8/1996 Hasegawa et al. ........ 525/92 A

FOREIGN PATENT DOCUMENTS

| EP | 0315363 A2 | 5/1989 |
| EP | 11-130952 A | 5/1999 |
| JP | 10061783 A * | 3/1998 |

* cited by examiner

*Primary Examiner*—Leo B. Tentoni
(74) *Attorney, Agent, or Firm*—Westerman, Hattori, Daniels & Adrian, LLP

(57) ABSTRACT

There is provided a flexible resin boot of which the noise-preventing effect lasts long and which ensures improved sealability and durability. The boot is formed from a base resin of a thermoplastic elastomer resin, and has a large port and a small port that are connected with each other via a bellows therebetween. For this, mineral oil or vegetable oil is added to the thermoplastic elastomer resin. Preferably, the thermoplastic elastomer resin is a thermoplastic polyester elastomer, and the mineral oil is process oil having an aromatic content of at most 13%. The boot is used for covering the constant velocity joint in an automobile.

22 Claims, 3 Drawing Sheets

PROCESS OF MAKING A FLEXIBLE RESIN BOOT

TECHNICAL FIELD

The present invention relates to a bellows-shaped flexible resin boot to be used, for example, in constant velocity joints for automobiles, and to a method for producing it.

BACKGROUND ART

A flexible resin boot of the type has a large port at one end to be fitted to the housing of a constant velocity joint of an automobile, and a small port at the other to be fitted to the axle thereof, and has a tapered bellows between the two ports. Applied to a constant velocity joint, it prevents grease from leaking out of the joint and prevents dust from entering the joint.

For forming such flexible boots, heretofore, chloroprene rubber has been used generally. However, flexible boots formed from chloroprene rubber are much expanded and deformed by the rotational centrifugal force, especially when they are rotated at high speed. In case where they are kept expanded and deformed under the condition for a long period of time, or where they undergo repeated expansion and contraction, they will be soon mechanically degraded and broken. Accordingly, the problem with such flexible boots is that their life is short.

Recently, thermoplastic elastomer resins such as thermoplastic polyester elastomer resins and the like having high elasticity have come to be used for forming flexible boots. The materials have the advantages of good heat resistance, good flexure resistance and high strength. However, flexible boots made from such high-elasticity thermoplastic elastomer resins are still problematic. Specifically, when the flexible boot is applied to a constant velocity joint in an automobile and when rotated therein while being bent at a wide angle, the mountains of its bellows are much rubbed against each other to make a noise and they are often worn away. In particular, in case where water adheres to the outer surface of the flexible boot, the noise is serious.

To solve the noise problem, proposed is adding silicone oil or fatty acid amide as a noise-preventing agent to thermoplastic polyester elastomer resins for flexible boots. For example, Japanese Patent Laid-Open No. 177971/1997 discloses a technique of adding a fatty acid amide to the resins for forming flexible boots.

When applied to the constant velocity joint in an automobile and when continuously rotated therein while being bent at a wide angle, the flexible resin boot of Japanese Patent Laid-Open No. 177971/1997 in which a fatty acid amide is added to a thermoplastic polyester elastomer resin makes no noise in early stages, but its noise-preventing effect could not last long. In fact, in the driving test of the flexible resin boot mounted constant velocity joint in an automobile, it has been found that the boot soon makes a noise after a certain period of time. To enhance and prolong the effect of the boot for noise prevention, the amount of the fatty acid amide to be added to the resin may be taken into consideration. However, increasing the amount of the fatty acid amide added to the resin results in the increase in the powdery fatty acid amide bled on the surface of the flexible boot, and the bled acid amide easily peels off. As a result, adding such an increased amount of the fatty acid amide is ineffective for actually enhancing and prolonging the effect of the boot for noise prevention. In addition, since the amount of the bled acid amide increases, the frictional factor between the large port or the small port of the boot and the housing of the constant velocity joint or the axle of an automobile lowers, and, as a result, the large port or the small port will slip more easily, whereby the boot will be dislocated to cause grease leakage from the joint. In fact, we, the present inventors have experienced grease leakage from the joint that worsens the ability of the boot to seal the joint.

The object of the present invention is to solve the problems as above, and to provide a flexible resin boot having the advantages of long-lasting noise prevention as well as a noise-prevention effect in early stages, sealability and durability.

DISCLOSURE OF INVENTION

The flexible resin boot of one aspect of the invention is formed from a base resin material of a thermoplastic elastomer resin and has a large port and a small port that are connected with each other via a bellows therebetween, and it is characterized in that mineral oil is added to the thermoplastic elastomer resin.

When applied to a constant velocity joint in an automobile and even when continuously rotated therein while being bent at a wide angle, the flexible resin boot of the invention having the constitution as above makes no noise in early stages, and, in addition, its noise-preventing effect lasts long. Another advantage of the resin boot is that it ensures good sealability and durability. The reason is because the mineral oil added to the thermoplastic elastomer resin for the boot of the invention is, when having bled on the surface of the boot, in the form of an oily film tightly adhering to the surface of the boot. It is therefore believed that the oily film thus tightly adhering to the surface of the boot does not easily peel off, being different from the bled powdery solid of the fatty acid amide in the related art technology as above.

For the thermoplastic elastomer resin for use in the invention, preferred is a thermoplastic polyester elastomer that comprises hard segments composed of an aromatic dicarboxylic acid and a low-molecular-weight glycol, and soft segments having a molecular weight of from 400 to 4000.

The flexible resin boot of the invention has good heat resistance, good bending resistance and good mechanical strength. In addition, since the resin to form the boot is combined with oil such as mineral oil or vegetable oil, the boot ensures improved sealability and durability. In particular, the noise-preventing effect of the boot is good in early stages, and it lasts long.

The thermoplastic elastomer resin to form the boot of the invention is preferably a thermoplastic polyester elastomer that comprises hard segments composed of an aromatic dicarboxylic acid and a low-molecular-weight glycol, and soft segments having a molecular weight of from 400 to 4000.

In the thermoplastic polyester elastomer to form the resin boot of the invention, the aromatic dicarboxylic acid that constitutes the hard segments is preferably at least one selected from terephthalic acid and naphthalenedicarboxylic acid, and the low-molecular-weight glycol that constitutes them is preferably at least one selected from ethylene glycol, 1,4-butanediol, 1,4-cyclohexanedimethanol and dimer glycols. More preferably, the aromatic dicarboxylic acid is terephthalic acid, and the low-molecular-weight glycol is 1,4-butanediol.

For the soft segments in the thermoplastic polyester elastomer to form the resin boot, preferred is any of polyoxytetramethylene glycol, polyoxypropylene glycol and aliphatic polyester-diols; and more preferred is polyoxytetramethylene glycol.

In case where the soft segments in the elastomer for use herein are of polyoxytetramethylene glycol, the copolymerization ratio of polyoxytetramethylene glycol to form the soft segments preferably falls between 35 and 55% by weight, more preferably between 40 and 50% by weight of the elastomer.

For the flexible resin boot of the invention, the mineral oil is preferably at least one process oil selected from paraffinic oil and naphthenic oil whose aromatic content is 13% or less.

The process oil of the type is well miscible with thermoplastic polyester elastomer (hereinafter referred to as TPEE). Therefore, when combined with TPEE to form boots, it well bleeds on the surface of the resin boots in the form of a thin oily film thereon, not swelling TPEE to worsen the physical properties including strength of TPEE, and enhances the initial and long-lasting noise-preventing effect of the resin boots. However, if the aromatic content of the process oil is larger than 13%, it is unfavorable since the process oil will swell TPEE.

More preferably, the mineral oil for use in the resin boot of the invention is at least one process oil selected from paraffinic oil and naphthenic oil whose aromatic content is from 0 to 10%.

In the flexible resin boot of the invention, it is desirable that at most 5 parts by weight of the process oil is added to 100 parts by weight of the thermoplastic elastomer resin. In case where too much process oil of over 5 parts by weight, relative to 100 parts by weight of the thermoplastic elastomer resin, is added to the resin, the valleys of the bellows of the boot will be damaged to have through-cracks in early stages depending on the composition of TPEE even though the time of noise prevention could be prolonged. In that case, the boot could not ensure good durability indispensable to it.

More preferably, the amount of the process oil to be added thereto is at most 3 parts by weight relative to 100 parts by weight of TPEE. In the more preferred case, the period of time after which the boot will be cracked can be prolonged more than in the case where the amount of the oil added is at most 5 parts by weight, and therefore the durability of the boot could be much more improved.

Another flexible resin boot of the invention is formed from a base resin material of a thermoplastic elastomer resin and has a large port and a small port that are connected with each other via a bellows therebetween, and it is characterized in that vegetable oil is added to the thermoplastic elastomer resin.

When applied to a constant velocity joint in an automobile and even when continuously rotated therein while being bent at a wide angle, the flexible resin boot of the type of the invention also makes no noise in early stages, and, in addition, its noise-preventing effect lasts long. Another advantage of the resin boot of the type is that it ensures good sealability and durability. The reason is because vegetable oil to be added to the thermoplastic elastomer resin for the boot is liquid, like mineral oil in the above, and its effect will be the same as that of mineral oil mentioned hereinabove.

In the flexible resin boot of the type, it is desirable that at most 5 parts by weight of vegetable oil is added to 100 parts by weight of the thermoplastic elastomer resin.

In case where too much vegetable oil of over 5 parts by weight, relative to 100 parts by weight of the thermoplastic elastomer resin, is added to the resin, the valleys of the bellows of the boot will be damaged to have through-cracks in early stages even though the time of noise prevention could be prolonged. In that case, the boot could not ensure good durability indispensable to it.

More preferably, the amount of vegetable oil to be added thereto is at most 3 parts by weight relative to 100 parts by weight of the thermoplastic elastomer resin. In the more preferred case, the period of time after which the boot will be cracked can be prolonged more than in the case where the amount of the vegetable oil added is at most 5 parts by weight, and therefore the durability of the boot could be much more improved.

In the flexible resin boot of the invention made from TPEE with mineral oil added thereto, it is desirable that the degree of swelling of the polyester elastomer in the mineral oil is at most 8% by volume.

In case where the degree of swelling of the polyester elastomer is larger than 8% by volume, the valleys of the bellows of the boot will be damaged to have through-cracks as the resin will be swollen. In that case, the boot could not ensure good durability indispensable to it.

In the flexible resin boot made from TPEE with mineral oil added thereto, it is more desirable that the degree of swelling of the polyester elastomer in the mineral oil is at most 6% by volume.

In case where the degree of swelling of the polyester elastomer is larger than 6% by volume, the valleys of the bellows of the boot will be damaged to have through-cracks as the resin will be swollen, and the boot could not ensure good durability indispensable to it.

The degree of swelling of the thermoplastic polyester elastomer (this is commercially-available resin itself not containing mineral oil or vegetable oil to be a composition for forming boots) is measured by dipping it in mineral oil at 100° C. for 48 hours.

One method for producing the flexible resin boot of the invention of which the large port and the small port are connected with each other via a bellows therebetween, from a base resin material of a thermoplastic polyester elastomer comprises adding a liquid additive containing mineral oil or vegetable oil to hot pellets of a thermoplastic polyester elastomer and mixing and stirring them, thereafter further kneading the resulting mixture and extruding it through an extruder to prepare a molding material, and finally molding the molding material into the flexible resin boot.

According to the method, the liquid additive containing mineral oil or vegetable oil is added to hot pellets of a thermoplastic polyester elastomer, and they are mixed and stirred. Therefore, in the method, the surfaces of the hot pellets are softened and are well wetted with the mineral oil or the vegetable oil added thereto, and the liquid additive can uniformly adhere to the surfaces of the pellets. Accordingly, when the mixture comprising the thermoplastic polyester elastomer pellets and the liquid additive is kneaded and extruded out through an extruder in the next step, obtained is a molding material that comprises the mineral oil or the vegetable oil uniformly dispersed in the thermoplastic polyester elastomer. The advantage of the flexible boot formed from the molding material is that its noise-preventing effect lasts long.

In the method, if desired, a solid additive may be added to and mixed with the mixture of the pellets and the liquid additive containing the mineral oil or the vegetable oil by stirring them, and the resulting mixture is then further kneaded and extruded to give the molding material.

If desired, after the pellets and the solid additive have been heated, they may be mixed by stirring them, and thereafter the liquid additive may be added to and mixed with the resulting mixture by further stirring them. Also if desired, after the liquid additive has been heated, it may be mixed with the pellets by stirring them. Also if desired, after the pellets, the liquid additive and the solid additive have been all heated, they may be stirred and mixed to prepare their mixture.

In the method for producing the flexible resin boot of the invention, the temperature at which the resin pellets and other components are heated is preferably not lower than 60° C., and more preferably falls between 70 and 100° C. If the heating temperature is lower than 60° C., the viscosity of the mineral oil or vegetable oil added to the resin pellets will be high and the oil could not be uniformly dispersed in the resin. On the other hand, the heating temperature higher than 100° C. is uneconomical. This is because, when the thermoplastic polyester elastomer pellets are stirred in a mixer or the like to generate frictional heat by which they are heated, the heating time will be too long, and the productivity will be low.

BEST MODE FOR CARRYING OUT THE INVENTION

An embodiment of the invention will be described with reference to the drawings.

Figure 1:
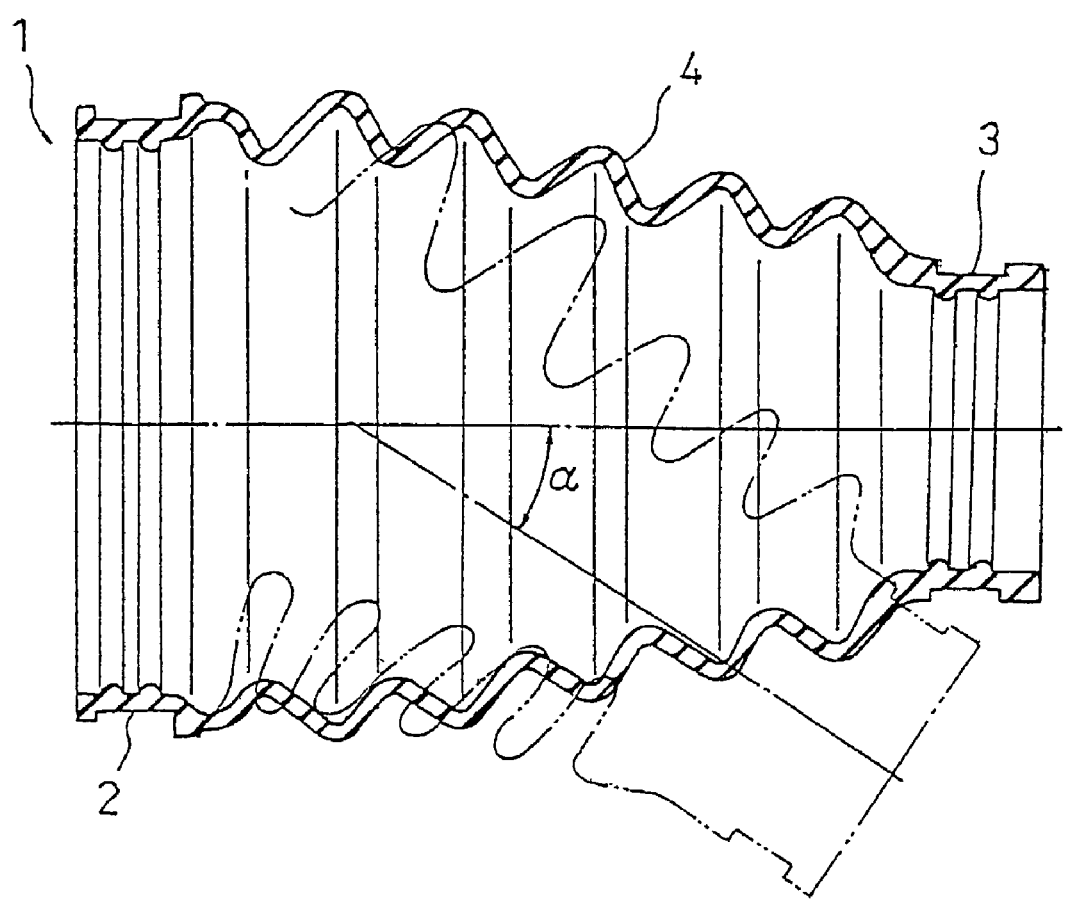
FIG. 1 is a vertically-cut side view of a flexible resin boot of one embodiment of the invention.

FIG. 1 is a cross-sectional view (a vertically-cut side view) of a flexible resin boot 1 of one embodiment of the invention. Integrally molded through a known molding method such as injection molding, press blow molding, injection blow molding and direct blow molding, the flexible resin boot 1 has a large port 2 at one end and a small port 3 at the other end, in which the large port 2 and the small port 3 are connected with each other via a tapered bellows 4 therebetween.

Figure 2:
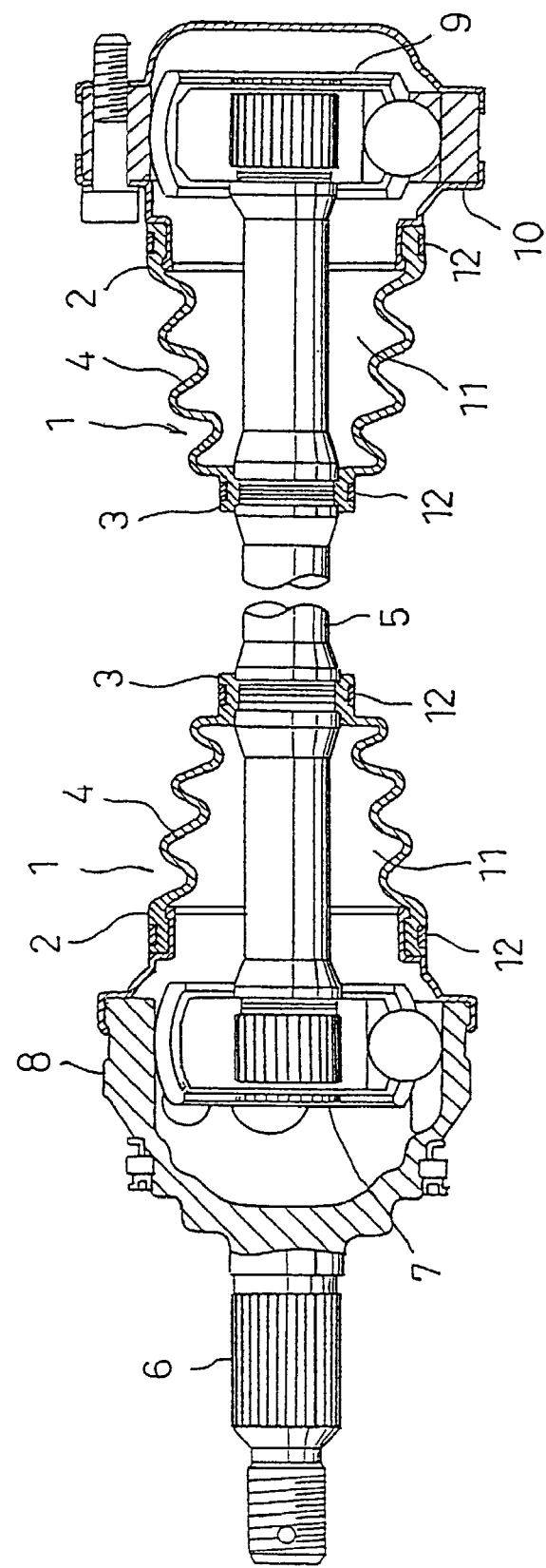
FIG. 2 is a cross-sectional view of flexible resin boots in practical use.

The thus-molded flexible resin boot 1 is built into an automobile, for example, as in FIG. 2. Briefly, as illustrated, two boots 1 are built into an automobile in such a manner that the large port 2 of one boot 1 is engaged over the outer case 8 of the inboard joint (universal joint) 7 that turnably and displacably interlocks the driving shaft 6 to the rear axle 5 while the large port 2 of the other boot 1 is engaged over the outer case 10 of the outboard joint 9, and the two ports 2 are fastened and clamped by the fastening clamps 12. The small ports 3 of the two boots 1 are engaged over the rear axle 5, and are fastened and clamped by the fastening clamps 12. In that manner, the two boots 1 cover the joints 7 and 9, while forming grease-sealing spaces 11, 11 inside each bellows 4.

The molding material for the flexible resin boot 1 comprises, as a base resin, a thermoplastic elastomer resin, and mineral oil or vegetable oil added thereto. Regarding the blend ratio of the constituent components, the amount of the mineral oil or the vegetable oil may be at most 5 parts by weight, but preferably at most 3 parts by weight, more preferably from 0.5 to 3 parts by weight, relative to 100 parts by weight of the thermoplastic elastomer resin. Too much mineral oil or vegetable oil of over 5 parts by weight, if added to the resin, will form through-cracks in the valleys of the bellows 4 in early stages. If so, the durability of the boot 1 will be poor.

The thermoplastic elastomer resin (TPE) for use in the invention may be any of polyester-based ones (TPEE), polyolefin-based ones (TPO), polyamide-based ones (TPAE), polyurethane-based ones (TPU) and others having good grease resistance, flexure fatigue resistance and flexibility; but preferred are polyester-based ones (TPEE).

As so mentioned hereinabove, TPEE comprises hard segments composed of an aromatic dicarboxylic acid and a low-molecular-weight glycol, and soft segments having a molecular weight of from 400 to 4000. The polyester hard segments are such that, when they alone form a polymer, the polymer has a melting point not lower than 180° C. On the other hand, the soft segments have a softening point or a melting point of not higher than 80° C.

Concretely, the aromatic dicarboxylic acid to form the hard segments includes terephthalic acid, diphenylcarboxylic acid, 5-sodium sulfoisophthalic acid, and also naphthalenedicarboxylic acids such as 2,6-naphthalenedicarboxylic acid, 1,5-naphthalenedicarboxylic acid, 1,4-naphthalenedicarboxylic acid, etc. Especially preferred for use herein is at least one selected from terephthalic acid and naphthalenedicarboxylic acids. Preferably, the aromatic dicarboxylic acid is combined with an aliphatic or alicyclic dicarboxylic acid, as broadening the latitude in controlling the properties of TPEE. The aliphatic or alicyclic dicarboxylic acid includes, for example, cyclohexanedicarboxylic acid, tetrahydrophthalic anhydride, succinic acid, glutaric acid, adipic acid, azelaic acid, sebacic acid, dodecanoic acid, dimer acids, hydrogenated dimer acids, etc.

In case where the aromatic dicarboxylic acid is combined with such an aliphatic or alicyclic dicarboxylic acid, the aromatic dicarboxylic acid content of the mixture is preferably at least 70 mol % of all the acid components, more preferably at least 75 mol %.

The low-molecular-weight glycol to form the hard segments includes, for example, ethylene glycol, 1,3-propylene glycol, 1,4-butanediol, 1,5-pentanediol, 1,6-hexanediol, 1,9-nonanediol, neopentyl glycol, dimethylolheptane, dimethylolpentane, tricyclodecanedimethanol, bisphenol A-ethylene oxide adduct, bisphenol F-ethylene oxide adduct, bisphenol S-ethylene oxide adduct, 1,4-cyclohexanedimethanol, dimer glycols, etc. Of those, especially preferred is at least one selected from ethylene glycol, 1,4-butanediol, 1,4-cyclohexanedimethanol, and dimer glycols.

For the hard segments, the aromatic dicarboxylic acid is more preferably terephthalic acid and the low-molecular-weight glycol is more preferably 1,4-butanediol.

For the soft segments constituting the thermoplastic polyester elastomer for use in the invention, for example, concretely mentioned are polyoxytetramethylene glycol (PTMG), polyoxypropylene glycol (PPG), and aliphatic polyester-diols. Preferably, the polyoxypropylene glycol is terminated by ethylene oxide units. The aliphatic polyester-diols include, for example, polycondensates of an aliphatic dicarboxylic acid such as adipic acid, azelaic acid, sebacic acid, dodecanoic acid, dimer acids, hydrogenated dimer acids or the like, with a glycol such as ethylene glycol, 1,3-propylene glycol, 1,4-butanediol, 1,5-pentanediol, 1,6- hexanediol, 1,9-nonanediol, neopentyl glycol, dimethylolheptane, dimethylolpentane or the like; ε-caprolactone polymers formed through ring-opening polymerization; PTMG-based copolymers with ε-caprolactone formed through ring-opening addition copolymerization, etc. For the soft segments, preferred is polyoxytetramethylene glycol, polyoxypropylene glycol, or poly-ε-caprolactonediol, and more preferred is polyoxytetramethylene glycol.

Some types of the thermoplastic polyester elastomer comprising the constituent components as above are available on the market, and preferred for use herein are PELPRENE® (from Toyo Boseki), HYTREL® (from Toray-DuPont), and ARNITEL® (from DSM). Especially preferred is a commercial product, PELPRENE P46D, which is a thermoplastic polyester elastomer comprising hard segments of a polymer composed of terephthalic acid and 1,4-butanediol, and soft segments of PTMG and having a PTMG comonomer content of from 40 to 50% by weight.

The mineral oil to be added to the thermoplastic elastomer resin includes paraffinic process oil, naphthenic process oil and aromatic process oil. These are available on the market, as softeners for rubber, and lubricants. Process oil generally contains paraffinic components, naphthenic components and aromatic components, and is grouped into paraffinic process oil, naphthenic process oil and aromatic process oil in accordance with the ratio of the constituent components. Of the process oil of the types mentioned herein, especially preferred for the flexible resin boot of the invention is paraffinic or naphthenic process oil having an aromatic content of at most 13%, and more preferred is paraffinic or naphthenic process oil having an aromatic content of from 0 to 10%, as so mentioned hereinabove. Even more preferred is paraffinic process oil having an aromatic content of from 0 to 10%. Especially in combination with TPEE, paraffinic process oil preferred has a paraffin content of from 60 to 78%, a naphthene content of from 20 to 35%, and an aromatic content of from 0 to 13%, more preferably from 0 to 10%. Paraffinic process oil of that type is available on the market, for example, as BJ Oil® (from Kyodo Yushi), PW90, PA90 and PW380 (all from Idemitsu Kousan), and using it herein is favorable.

The paraffin content, the naphthene content and the aromatic content of process oil are measured according to a method of structural group analysis (ring analysis) (n-d-M method) (described in *Handbook of Lubricants* by the Lubricant Society of Japan, 1982, 6th Edition).

Preferred examples of vegetable oil for use herein are rapeseed oil, linseed oil, soybean oil, castor oil, etc.

Adding mineral oil or vegetable oil, preferably process oil having an aromatic content of at most 13% to the thermoplastic polyester elastomer brings about the following benefits, as the two are well miscible with each other in good balance. The oil bleeds little by little on the surface of the thermoplastic elastomer resin, and it can exhibits its noise-preventing effect for a long period of time. In addition, the mineral oil or vegetable oil has no negative influence on the physical properties of the thermoplastic elastomer resin, and the boots formed from the resin well satisfy the durability standards in the art.

In case where the mineral oil for use herein is process oil, its mean molecular weight including number-average molecular weight, weight-average molecular weight and Z-average molecular weight is measured through gel permeation chromatography (GPC) in SYSTEM-21 (from Showa Denko) having a column unit of $GMH_{XL}$-$GMH_{XL}$-$G2000H_{XL}$ (from Toso), in which a solvent of chloroform is applied to the column (flow rate: 0.7 ml/min) at 40° C. Monodispersed polystyrene is used as the standard substance and the molecular weight of the oil sample thus analyzed in the system is derived from the differential refractive index (RI) thereof in terms of polystyrene.

Preferably, the number-average molecular weight of the process oil for use in the invention falls between 200 and 2000, more preferably between 500 and 1000. Flexible boots 1 formed from a thermoplastic elastomer resin that contains process oil having a number-average molecular weight of larger than 2000 will soon make a noise in early stages. Flexible boots 1 formed from a thermoplastic elastomer resin that contains process oil having a number-average molecular weight of smaller than 200 could not prevent a noise for a long period of time, though they do not make a noise in early stages. Accordingly, it is desirable that the number-average molecular weight of the process oil for use herein falls within the defined range.

Also preferably, the weight-average molecular weight of the process oil for use in the invention falls between 200 and 2000, more preferably between 500 and 1400. Flexible boots 1 formed from a thermoplastic elastomer resin that contains process oil having a weight-average molecular weight of larger than 2000 will make a noise in early stages. Flexible boots 1 formed from a thermoplastic elastomer resin that contains process oil having a weight-average molecular weight of smaller than 200 could not prevent a noise for a long period of time, though they do not make a noise in early stages. Accordingly, it is desirable that the weight-average molecular weight of the process oil for use herein falls within the defined range.

Also preferably, the Z-average molecular weight of the process oil for use in the invention falls between 200 and 3000, more preferably between 500 and 2000. Flexible boots 1 formed from a thermoplastic elastomer resin that contains process oil having a Z-average molecular weight of larger than 3000 will make a noise in early stages. Flexible boots 1 formed from a thermoplastic elastomer resin that contains process oil having a Z-average molecular weight of smaller than 200 could not prevent a noise for a long period of time, though they do not make a noise in early stages. Accordingly, it is desirable that the Z-average molecular weight of the process oil for use herein falls within the defined range.

Also preferably, the kinematic viscosity of the process oil for use in the invention falls between 100 and 1000 $mm^2$/sec, more preferably between 100 and 500 $mm^2$/sec. The kinematic viscosity is measured with a B-type viscometer at an ambient temperature of 25° C. (according to JIS K7117).

Process oil having a kinematic viscosity of larger than 1000 $mm^2$/sec could hardly bleed on the surfaces of flexible boots, and its noise-preventing ability will be poor. Process oil having a kinematic viscosity of smaller than 100 $mm^2$/sec will bleed too rapidly on the surfaces of flexible boots, and its noise-preventing effect could not last long. Accordingly, it is desirable that the kinematic viscosity of process oil for use herein falls within the defined range.

In adding a liquid additive such as mineral oil, vegetable oil or a liquid antioxidant to a thermoplastic elastomer resin and kneading them, the problem is how to uniformly disperse the liquid additive in the resin. To the base resin of a thermoplastic elastomer, generally added are solid additives such as antioxidant, pigment, etc. In case where a liquid additive such as mineral oil or vegetable oil is added to an elastomer resin after solid additives have been added thereto and stirred, the solid additives and the liquid additive will clump and could not be uniformly dispersed in the resin.

Another problem is that the viscosity of the liquid additive such as mineral oil or vegetable oil increases in a low-temperature atmosphere in the winter season or the like, and the liquid additive will more readily clump together with solid additives in a resin. Even when the resin mixture in that condition is kneaded and extruded out through a double-screw extruder, it is often impossible to obtain a resin material containing solid and liquid additives uniformly dispersed therein.

We, the present inventors have found that, when hot pellets of a thermoplastic polyester elastomer resin are mixed and stirred with mineral oil or vegetable oil added thereto, then the mineral oil or the vegetable oil can uniformly adhere onto the surfaces of the resin pellets. In addition, we have further found that, when the resin mixture in that condition is stirred with any other solid additives such as antioxidant, pigment, etc., then the solid additives and the liquid additive such as mineral oil, vegetable oil or a liquid antioxidant can uniformly adhere onto the surfaces of the resin pellets.

If desired, after thermoplastic polyester elastomer pellets and a liquid additive such as mineral oil, vegetable oil or a liquid antioxidant are all heated, mixed and stirred, solid additives such as antioxidant, pigment, etc. may be added thereto, and further mixed and stirred. Also if desired, after thermoplastic polyester elastomer pellets and solid additives such as antioxidant, pigment, etc. are all heated, mixed and stirred, the liquid additive may be added thereto, and further mixed and stirred. Still if desired, thermoplastic polyester elastomer pellets, liquid additive containing mineral oil or vegetable oil, and other solid additives may be all heated, and then mixed and stirred.

In case where the mixture having been prepared by mixing and stirring thermoplastic polyester elastomer pellets, the liquid additive and the solid additives is kneaded and extruded out through a double-screw extruder, obtained is a boot-forming material in which the liquid additive and the solid additives are uniformly dispersed in the thermoplastic polyester elastomer. The material can be formed into flexible boots having the advantage of long-lasting noise prevention.

In the production method, the liquid additive may be mineral oil or vegetable oil alone, but may be combined with any other additive such as liquid antioxidant, etc.

Preferably, the temperature at which the resin pellets and other components are heated is not lower than 60° C., and more preferably falls between 70 and 100° C. If the heating temperature is lower than 60° C., the viscosity of the mineral oil or vegetable oil added to the resin pellets will be high and the oil could not be uniformly dispersed in the resin. On the other hand, the heating temperature higher than 100° C. is uneconomical. This is because, when the base resin pellets of thermoplastic polyester elastomer are stirred in a mixer or the like to generate frictional heat by which they are heated, for example, according to the heating method mentioned below, the heating time will be too long, and the productivity will be low.

For heating thermoplastic polyester elastomer pellets, employable is a method of stirring the pellets in a mixer or the like to generate frictional heat by which they are heated, or a method of using an ordinary hot-air drier.

In the stirring method, generally used is a mixer or a tumbler. For kneading and extruding the resin mixture to give a boot-forming material, usable is any ordinary single-screw extruder, but preferred is a double-screw extruder. In the boot-forming material obtained through a double-screw extruder, the liquid additive and the solid additive can be uniformly dispersed in the base resin.

Adding various additives to the thermoplastic elastomer resin, preferably TPEE for improving the properties and the processability of the resin in producing the flexible resin boot of the invention is a preferred embodiment of the invention. The additives include, for example, antioxidant, light stabilizer, antistatic agent, molecular weight-controlling agent such as peroxides, metal inactivator, organic or inorganic nucleating agent, filler, vehicle, reinforcing agent, colorant, etc.

For the antioxidant, usable are any known liquid or solid compounds such as hindered phenols, sulfur-containing compounds, phosphorus-containing compounds, etc. The light stabilizer may also be any known one, including, for example, hindered amines, triazoles, benzophenones, benzoates, nickel-containing compounds, salicylic compounds, etc.

Any known fillers, vehicles, reinforcing agents and colorants may be used herein with no specific limitation. Concretely, herein usable are various types of carbon black, silicic compounds such as silica, calcium silicate, kaolin, talc, clay, diatomaceous earth, wollastonite, etc.; metal carbonates such as calcium carbonate, barium carbonate, etc.; organic or inorganic pigments, etc.

EXAMPLES

Examples 1 to 5

To a base material of a thermoplastic polyester elastomer, PELPRENE P46D (from Toyo Boseki—this comprises hard segments of a polymer of terephthalic acid and 1,4-butanediol and soft segments of PTMG, and has a PTMG comonomer content of from 40 to 50% by weight), added was mineral paraffinic process oil, BJ Oil (from Kyodo Yushi) to prepare a composition for boots. Using an injection molding machine, the composition was molded into flexible resin boots. The blend ratio of mineral oil was varied within a range of from 0.5 to 5.0 parts by weight to 100 parts by weight of the thermoplastic polyester elastomer, as in Table 1 below.

BJ Oil used herein was analyzed according to a method of structural group analysis (n-d-M method), and it had a paraffin content of 68%, a naphthene content of 25% and an aromatic content of 7%. Through GPC, the molecular weight of BJ Oil was measured. Though varying depending on its lots, the oil had a number-average molecular weight of from 660 to 700, a weight-average molecular weight of from 810 to 850, a z-average molecular weight of from 1000 to 1100, and had a kinematic viscosity of from 260 to 400.

Comparative Examples 1 to 6

The same thermoplastic polyester elastomer as in Examples 1 to 5 was used as the base material. In Comparative Example 1, however, no mineral oil was added to the elastomer, and the elastomer was molded into flexible resin boots in the same manner as in Examples 1 to 5, using an injection molding machine. In Comparative Example 2, 7 parts by weight of the same mineral oil as in Examples 1 to 5 was added to 100 parts of the thermoplastic elastomer resin, and the mixture was molded into flexible resin boots in the same manner as above. In Comparative Examples 3 to 6, a low-melting-point fatty acid amide A (oleyloleamide) and a high-melting-point fatty acid amide B (ethylenebisstearamide) were added to 100 parts by weight of the thermoplastic elastomer resin, the blend ratio of the acid amides being indicated in Table 1, and the mixture was molded into flexible resin boots in the same manner as above.

The flexible resin boots of Examples 1 to 5 and Comparative Examples 1 to 6, having been molded in the manner as above, were built into constant velocity joints, and tested for their capability of noise prevention, sealability and durability. The test results are given in Table 1. The test methods employed herein are mentioned below.

(1) Noise Prevention:

A boot to be tested is built into a constant velocity joint, and rotated at low speed. Being thus rotated, the boot is checked as to whether or not it makes a noise in early stages. Boots that rotate noiselessly in the test are good (O); and those that rotate noisily therein are not good (x). Rotating the boot is continued, and the time at which the rotating boot has become noisy is read. Boots having become noisy before the target time of noise prevention, 25 minutes, are not good (x); and those still noiselessly rotating even after that target time of noise prevention are good (O). Regarding the condition for the noise test, the ambient atmosphere is at room temperature (RT); the maximum angle to the constant velocity joint (the angle α in FIG. 1) is 49°; and the number of revolution is 150 rpm. The surface of the flexible boot being tested is kept wetted with water all the time during the test.

(2) Sealability:

A boot to be tested is built into a constant velocity joint and continuously rotated for a predetermined period of time. After having thus tested, the boot is checked as to whether or not its large port 2 or small port 3 airtightly fastened by the fastening clamp 12 slips on the outer surface of the outer cases 8, 10 or the rear axle 5, and is thereby dislocated from the predetermined original position, or as to whether or not grease is leaked out of the boot. Boots that suffer from any of dislocation and grease leakage in the test are not good (x); and those not suffering from any of them are good (O). Concretely, a flexible boot to be tested is built into a constant velocity joint, and continuously rotated for 6 weeks at an ambient temperature of 30° C. and at a maximum angle to the constant velocity joint of 47°. The number of revolution is 100 rpm. Immediately after the test, the boot is checked for its condition.

(3) Durability:

A boot to be tested is built into a constant velocity joint, and continuously rotated in a high-temperature atmosphere at 100° C. until it is cracked to have through-cracks in the valleys of its bellows. During the test, the maximum angle to the constant velocity joint is 43°, and the number of revolution is 500 rpm. The time at which the boot being tested is cracked is read. Boots cracked before the target time of durability, 30 hours, are not good (x); and those not cracked even after that target time of durability are good (O).

As in Table 1, the boots of Examples 1 to 5, to which was added from 0.5 to 5 parts by weight of mineral paraffinic oil, are all good with respect to their noise-preventing capability, sealability and durability.

The boot of Comparative Example 1, to which was added no mineral oil, made a noise in early stages. The boot of Comparative Example 2, to which was added 7 parts by weight of mineral paraffinic oil, has good noise-preventing capability and sealability. However, it cracked in relatively early stages in the valleys of its bellows. This means that the durability of the boot of Comparative Example 2 is poor.

The boots of Comparative Examples 3 and 4, to which was added a lubricant of fatty acid amides (A/B) in a blend ratio of 0.7/0.06 parts by weight or 1.5/0.15 parts by weight, have good sealability and durability, and make no noise in early stages. However, their noise-preventing effect did not last long, and their noise-preventing capability is unsatisfactory. The boot of Comparative Example 5, to which was added a lubricant of fatty acid amides (A/B) in a blend ratio of 1.8/0.15 parts by weight, makes no noise in early stages. However, its noise-preventing effect did not last long, and its sealability and durability are both poor. The boot of Comparative Example 6, to which was added a lubricant of fatty acid amides (A/B) in a blend ratio of 1.5/0.2 parts by weight, makes no noise in early stages and its noise-preventing effect lasted relatively long. It has good noise-preventing capability, but its sealability and durability are both poor.

TABLE 1

|  |  | Example | | | | | Comparative Example | | | | | |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| Additive |  | Mineral Oil | | | | | Mineral Oil | | Fatty Acid Amides (A/B) | | | |
| Amount Added (wt. pts.) |  | 0.5 | 1 | 2 | 3 | 5 | 0 | 7 | 0.7/0.06 | 1.5/0.15 | 1.8/0.15 | 1.5/0.2 |
| Noise | noise in early stages | o | o | o | o | o | x | o | o | o | o | o |
| Prevention | duration of noise prevention (min) | >60 | >60 | >60 | >60 | >60 | 0 | >60 | 15 | 18 | 23 | 28 |
|  | for the target time of noise prevention, 25 minutes | o | o | o | o | o | x | o | x | x | x | x |
| Sealability |  | o | o | o | o | o | o | o | o | o | x | x |
| Duraability | time before formation of through-cracks (hr) | 35 | 33 | 33 | 33 | 31 | 32 | 27 | 33 | 33 | 28 | 27 |
|  | for the target time of durability, 30 hours | o | o | o | o | o | o | x | o | o | x | x |

Examples 6 to 10

The same thermoplastic polyester elastomer as in Examples 1 to 5 was used as the base material. To this was added mineral paraffinic process oil having a number-average molecular weight of 200 (Example 6), 500 (Example 7), 750 (Example 8), 1000 (Example 9), or 2000 (Example 10), as in Table 2 below. The resulting mixture was molded into flexible resin boots in the same manner as in Example 1. In these Examples 6 to 10, the blend ratio of the paraffinic process oil was 1.5 parts by weight to 100 parts by weight of the thermoplastic polyester elastomer.

Comparative Example 7 to 9

Flexible resin boots were produced in the same manner as in Examples 6 to 10, except that paraffinic process oil having a number-average molecular weight of 100 (Comparative Example 7), 2250 (Comparative Example 8) or 2500 (Comparative Example 9) was used as in Table 2.

The flexible resin boots of Examples 6 to 10 and Comparative Examples 7 to 9, having been molded in the manner as above, were built into constant velocity joints, and tested for their capability of noise prevention. The test method is as follows: A boot to be tested is built into a constant velocity joint, and rotated at low speed. Being thus rotated, the boot is checked as to whether or not it makes a noise in early stages. Rotating the boot is continued, and the time at which the rotating boot has become noisy is read. The target time of noise prevention is 25 minutes. In the test, the ambient atmosphere is at room temperature (RT); the maximum angle to the constant velocity joint (the angle $\alpha$ in FIG. 1) is 49°; and the number of revolution is 150 rpm. The surface of the flexible boot being tested is kept wetted with water all the time during the test. The test results are given in Table 2.

The boot of Comparative Example 7, to which was added paraffinic oil having a small number-average molecular weight, made no noise in early stages. With it, however, the duration of noise prevention is only 10 minutes and is relatively short. This means that the noise-preventing capability of the boot is not satisfactory. The boots of Comparative Examples 8 and 9, to which was added paraffinic oil having an extremely large number-average molecular weight, were not good, since the paraffinic process oil added thereto hardly bleed on their surfaces. Therefore, the boots made a noise in early stages. As opposed to these, the boots of Examples 6 and 10 ensured long duration of noise prevention for 25 minutes. Their data reached the target. The boots of Examples 7, 8 and 9 produced better results, having ensured longer duration of noise prevention for longer than 60 minutes.

molecular weight of 200 (Example 11), 500 (Example 12), 950 (Example 13), 1400 (Example 14), or 2000 (Example 15), as in Table 3 below. Using an injection molding machine, the resulting mixture was molded into flexible resin boots. In these Examples 11 to 15, the blend ratio of the paraffinic process oil was 1.5 parts by weight to 100 parts by weight of the thermoplastic polyester elastomer.

Comparative Example 10 to 12

Flexible resin boots were produced in the same manner as in Examples 11 to 15, except that paraffinic process oil having a weight-average molecular weight of 100 (Comparative Example 10), 2250 (Comparative Example 11) or 2500 (Comparative Example 12) was used as in Table 3.

The flexible resin boots of Examples 11 to 15 and Comparative Examples 10 to 12, having been molded in the manner as above, were built into constant velocity joints, and tested for their capability of noise prevention. The test method is the same as in Examples 6 to 10 and Comparative Examples 7 to 9. The test results are given in Table 3.

The boot of Comparative Example 10, to which was added paraffinic oil having a small weight-average molecular weight, made no noise in early stages. With it, however, the duration of noise prevention is only 10 minutes and is relatively short. This means that the noise-preventing capability of the boot is not satisfactory. The boots of Comparative Examples 11 and 12, to which was added paraffinic oil having an extremely large weight-average molecular weight, made a noise in early stages. As opposed to these, the boots

TABLE 2

|  | Example | | | | | Comparative Example | | |
| --- | --- | --- | --- | --- | --- | --- | --- | --- |
|  | 6 | 7 | 8 | 9 | 10 | 7 | 8 | 9 |
| Paraffinic Oil, number-average molecular weight | 200 | 500 | 750 | 1000 | 2000 | 100 | 2250 | 2500 |
| Time before noise (min) | 25 | >60 | >60 | >60 | 25 | 10 | 1 | 1 |

Examples 11 to 15

The same thermoplastic polyester elastomer as in Examples 1 to 5 was used as the base material. To this was added mineral paraffinic process oil having a weight-average of Examples 11 and 15 ensured long duration of noise prevention for 25 minutes. Their data reached the target. The boots of Examples 12, 13 and 14 produced better results, having ensured longer duration of noise prevention for longer than 60 minutes.

TABLE 3

|  | Example | | | | | Comparative Example | | |
| --- | --- | --- | --- | --- | --- | --- | --- | --- |
|  | 11 | 12 | 13 | 14 | 15 | 10 | 11 | 12 |
| Paraffinic Oil, weight-average molecular weight | 200 | 500 | 950 | 1400 | 2000 | 100 | 2250 | 2500 |
| Time before noise (min) | 25 | >60 | >60 | >60 | 25 | 10 | 1 | 1 |

Examples 16 to 20

The same thermoplastic polyester elastomer as in Examples 1 to 5 was used as the base material. To this was added mineral paraffinic process oil having a Z-average molecular weight of 200 (Example 16), 500 (Example 17), 1300 (Example 18), 2000 (Example 19), or 3000 (Example 20), as in Table 4 below. The resulting mixture was molded into flexible resin boots in the same manner as in Example 1. In these Examples 16 to 20, the blend ratio of the paraffinic process oil was 1.5 parts by weight to 100 parts by weight of the thermoplastic polyester elastomer.

Comparative Examples 13 to 15

Flexible resin boots were produced in the same manner as in Examples 16 to 20, except that paraffinic process oil having a Z-average molecular weight of 100 (Comparative Example 13), 3500 (Comparative Example 14) or 4000 (Comparative Example 15) was used as in Table 4.

The flexible resin boots of Examples 16 to 20 and Comparative Examples 13 to 15, having been molded in the manner as above, were built into constant velocity joints, and tested for their capability of noise prevention. The test method is the same as in Examples 6 to 10 and Comparative Examples 7 to 9. The test results are given in Table 4.

The boot of Comparative Example 13, to which was added paraffinic oil having a small z-average molecular weight, made no noise in early stages. With it, however, the duration of noise prevention is only 10 minutes and is relatively short. This means that the noise-preventing capability of the boot is not satisfactory. The boots of Comparative Examples 14 and 15, to which was added paraffinic oil having an extremely large Z-average molecular weight, made a noise in early stages. As opposed to these, the boots of Examples 16 and 20 ensured long duration of noise prevention for 25 minutes. Their data reached the target. The boots of Examples 17, 18 and 19 produced better results, having ensured longer duration of noise prevention for longer than 60 minutes.

Examples 21 and 22

The same thermoplastic polyester elastomer, PELPRENE 46D, as in Example 1 was used as the material for flexible resin boots. Pellets of the thermoplastic polyester elastomer were heated at 60° C. (Example 21) or 80° C. (Example 22), to which was added 1.5 parts by weight of paraffinic process oil (BJ Oil® from Kyodo Yushi). These were stirred in a mixer, and other solid additives, 1.0 part by weight of antioxidant (NOCRAC810-NA® from Ouchi Shinko) and 1.0 part by weight of pigment (carbon black, SEAST GSO having a mean particle size of 43 nm) were added thereto, and further stirred. The resulting mixture was kneaded and extruded out through a double-screw extruder (Toshiba's double-screw extruder, TEM100) to prepare a molding material. The molding material was molded into flexible boots. To heat them, the pellets were stirred in Kawata's Super Mixer SMC-300N at 100 rpm. In the extruder, the screw revolution was 100 rpm, and the cylinder temperature was 240° C.

Comparative Example 16

From the same thermoplastic polyester elastomer pellets and the same additives as in Examples 21 and 22, a molding material was prepared in the same manner as above. The molding material was molded into flexible boots. In Comparative Example 16, however, the pellets were not heated, and the paraffinic oil was added thereto at room temperature (23° C.).

The flexible resin boots of Examples 21 and 22 and Comparative Example 16, having been molded in the manner as above, were tested for their capability of noise prevention in the same test method as in Examples 6 to 10 and Comparative Examples 7 to 9. The test results are given in Table 5.

As in Table 5, the boots of Example 21 (for which the pellets were at 60° C.) and Example 22 (for which the pellets were at 80° C.) ensured duration of noise prevention for longer than 25 minutes, and these reached the target. However, the duration of noise prevention with the boot of Comparative Example 16 was 15 minutes and was short. This is because the dispersibility of the liquid additive and the solid additives in the resin in Comparative Example 16 was relatively poor.

TABLE 4

|  | Example | | | | | Comparative Example | | |
| --- | --- | --- | --- | --- | --- | --- | --- | --- |
|  | 16 | 17 | 18 | 19 | 20 | 13 | 14 | 15 |
| Paraffinic Oil, Z-average molecular weight | 200 | 500 | 1300 | 2000 | 3000 | 100 | 3500 | 4000 |
| Time before noise (min) | 25 | >60 | >60 | >60 | 25 | 10 | 1 | 1 |

TABLE 5

|  | Example | | Comparative Example |
| --- | --- | --- | --- |
|  | 21 | 22 | 16 |
| Liquid Additive | paraffinic oil 1.5 wt. pts. | paraffinic oil 1.5 wt. pts. | paraffinic oil 1.5 wt. pts. |
| Solid Additives | pigment 1.0 wt. pt. antioxidant 1.0 wt. pt. | pigment 1.0 wt. pt. antioxidant 1.0 wt. pt. | pigment 1.0 wt. pt. antioxidant 1.0 wt. pt. |
| Temperature of Pellets (° C.) | 60 | 80 | 23 |
| Time before Noise | >60 min | >60 min | 15 min |

Example 23

The same thermoplastic polyester elastomer as in Examples 1 to 5 was used as the base material. To this was added the same mineral paraffinic oil as in Example 1 to 5. The blend ratio of the oil was 1.5 parts by weight to 100 parts by weight of the resin. Using an injection molding machine, the resulting mixture was molded into flexible resin boots.

Comparative Example 17

The same thermoplastic polyester elastomer resin as in Example 23 was used as the base material. In this, no paraffinic oil was added to the resin, but 0.3 parts by weight of oleyloleamide and 0.08 parts by weight of ethylenebisstearamide, relative to 100 parts by weight of the resin, were added thereto. The resulting mixture was molded into flexible resin boots in the same manner as above.

The flexible boots of Example 23 and Comparative Example 17, having been molded in the manner as above, were tested for the bleeding property of the noise-preventing agent, oil or fatty acid amide. Concretely, the molded flexible boots were left at room temperature in three different manners: (a) The boots were left as they were with no specific treatment applied thereto; (b) the boots were wiped at intervals of 14 days; and (c) the boots were wiped at intervals of 7 days. While being left in those manners, the boots were checked for the amount of the deposit of oil or fatty acid amide bled on their surfaces. To measure the amount of the deposit, the inner and outer surfaces of each boot were wiped with soft cloth, and the cloth was weighed before and after the surfaces were wiped. The weight change indicates the amount of the deposit. The amount of the deposit is represented in terms of the weight (mg) of deposit per boot (55 g).

In the test (a) where the boots were left as they were with no specific treatment applied thereto, the amount of the deposit was measured on days 1, 3, 4, 7, 14, 28, 42 and 56 after the boots were molded. In the test (b) where the boots were wiped at intervals of 14 days, the deposit on the surfaces of each boot was wiped away at intervals of 14 days and the amount of the deposit was measured on predetermined days after the boots were molded. In the test (c) where the boots were wiped at intervals of 7 days, the deposit on the surfaces of each boot was wiped away at intervals of 7 days and the amount of the deposit was measured on predetermined days after the boots were molded.

Figure 3:
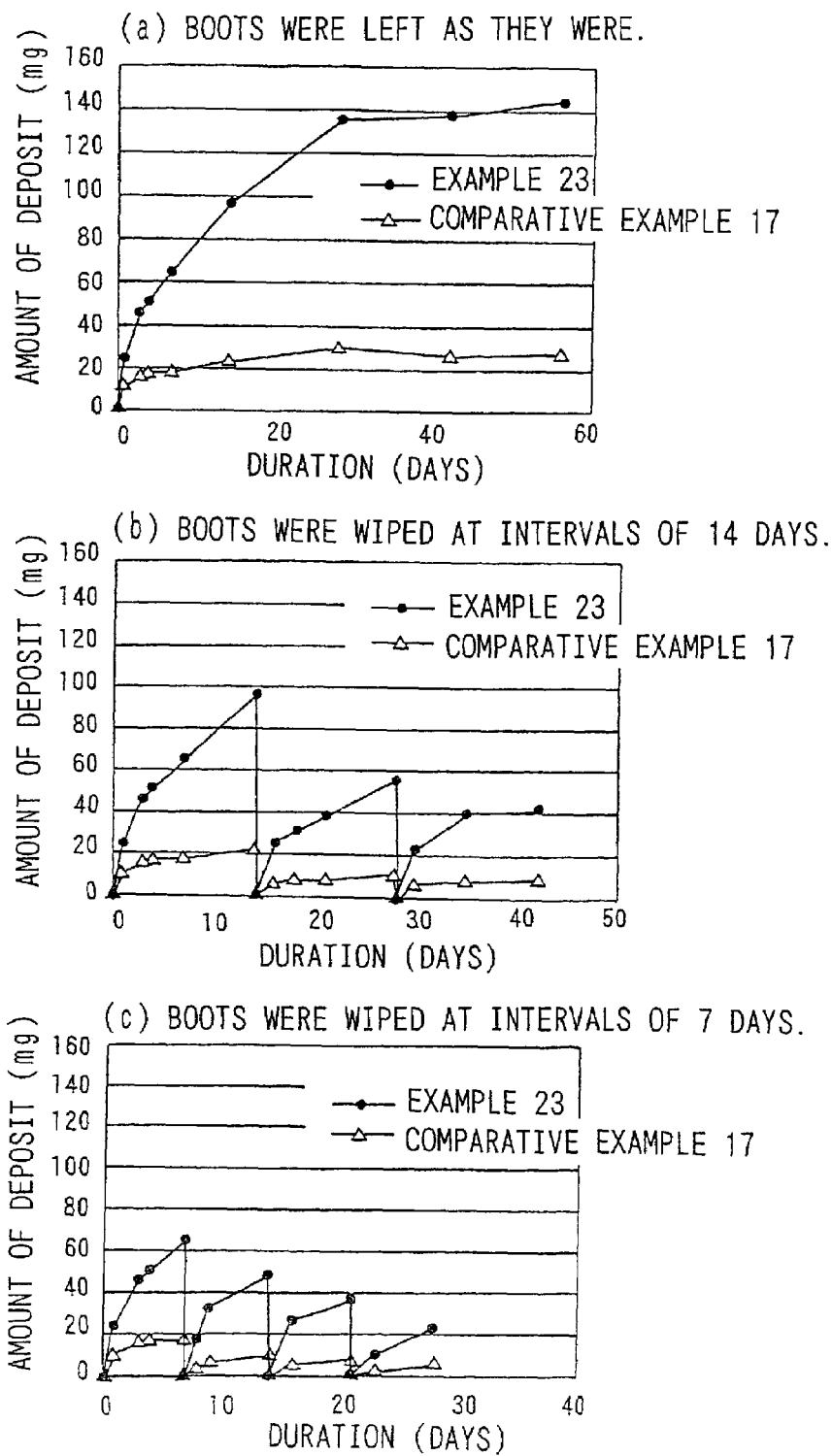
FIG. 3 is a set of graphs showing the bleeding profile of the noise-preventing agent on the flexible resin boots produced in Example 23 and Comparative Example 17. The graph (a) indicates the data of a test where the boots were left as they were with no specific treatment applied thereto; the graph (b) indicates the data of a test where the boots were wiped at intervals of 14 days; and the graph (c) indicates the data of a test where the boots were wiped at intervals of 7 days.

The data are plotted in FIG. 3. As in these, the amount of the noise-preventing agent bled on the surfaces of the boots of Example 23 is larger than that of Comparative Example 16. Even in the tests where the surfaces of the boots were wiped at regular intervals, the amount of the noise-preventing agent bled on the surfaces of the boots of Example 23 is still larger than that of Comparative Example 16, even though it gradually decreases after repeated wiping operations. Immediately after the surfaces of the boots of Example 23 were wiped, the amount of the deposit soon reached the lowermost level (13 mg) for noise prevention. However, after the surfaces of the boots of Comparative Example 16 were wiped, the noise-preventing agent could bleed only a little on the surfaces and its amount could not soon reach the lowermost level (7 mg/1 boot) for noise prevention.

[Measurement of Degree of Swelling]

PELPRENE P46D alone not containing process oil, which is for the composition to be molded into flexible resin boots, was dipped in various types of process oil to measure its degree of swelling in each oil, according to JIS K6258 (cured rubber dipping test). The condition for the measurement is mentioned below. In Table 6, Cp, Cn and Ca indicate the paraffin content, the naphthene content and the aromatic content, respectively, of each oil, analyzed according to a method of structural group analysis (n-d-M method).

Test piece: 20 mm×50 mm×2.0 mm
Temperature: 100° C.
Dipping time: 48 hours

The data are represented in terms of the volume change (vol. %) and the weight change (wt. %) of each sample tested, and shown in Table 6. From the data, it is understood that, when paraffinic process oil having a paraffin content of from 60 to 78%, a naphthene content of from 20 to 35% and an aromatic content of from 1 to 10% is added to TPEE and the resulting composition is formed into boots, the oil is well held in the resin boots and bleeds in some degree on the surface of the boots, and is therefore effective for preventing the initial noise of the boots and for prolonging the noise-preventing effect of the boots, and, in addition, the oil is effective for enhancing the sealability and the durability of the boots.

TABLE 6

| | | Constituent Contents (%) | | | Degree of Swelling | |
|---|---|---|---|---|---|---|
| | | | | | volume change | weight change |
| Process Oil | Supplier | Cp | Cn | Ca | (vol. %) | (wt. %) |
| Paraffinic Process Oil BJ Oil | Kyodo Yushi | 68 | 25 | 7 | 1.81 | 0.78 |
| Paraffinic Process Oil PW90 | Idemitsu Kosan | 71 | 29 | 0 | ~0 | ~0 |
| Naphthenic Process Oil Sunthene 410 | Idemitsu-Sun Oil | 42 | 42 | 15 | 12.8 | 9.88 |
| Naphthenic Process Oil Sunthene 4240 | Idemitsu-Sun Oil | 41 | 41 | 18 | 8.22 | 6.76 |
| Aromatic Process Oil X140 | Japan Energy | 33 | 23 | 41 | 20.4 | 18.9 |

(Relationship Between the Constitution and the Deposit Amount of Process Oil)

Herein measured is the bleeding property of oil on shaped samples of boot-molding materials. To the same base material, thermoplastic polyester elastomer as in Example 1, added was any of different types of mineral process oil shown in Table 7 to prepare molding compositions for boots in the same manner as in Example 1. The blend ratio of the oil was 1.5 parts by weight to 100 parts by weight of the thermoplastic elastomer. The molding composition was shaped into test samples of 10 cm×5 cm×0.2 cm, and these were left at room temperature. After 7 days, 14 days and 28 days, the oil having bled on their surface was wiped up with a cloth, and its amount was measured.

As in Table 7, it is understood that the process oil having a low aromatic content well bled on the surface of the shaped samples, and its bleeding property is good.

Applied to a constant velocity joint in an automobile, the flexible resin boot of the invention makes no noise in early stages even when continuously rotated while being bent at a wide angle. In that condition, in addition, the noise-preventing effect of the boot lasts long, and the boot ensures improved sealability and durability.

TABLE 7

| Process Oil | Supplier | Constituent Contents (%) | | | Amount of Oil Deposit (mg/100 cm²) | | |
|---|---|---|---|---|---|---|---|
| | | Cp | Cn | Ca | after 7 days | after 14 days | after 28 days |
| BJ Oil | Kyodo Yushi | 68 | 25 | 7 | 8.5 | 9.2 | 11.8 |
| PW90 | Idemitsu Kosan | 71 | 29 | 0 | 17.6 | 19.7 | 21.5 |
| PA90 | Idemitsu Kosan | 71 | 26 | 3 | 16.7 | 18.3 | 20.7 |
| PW380 | Idemitsu Kosan | 73 | 27 | 0 | 13.2 | 14.2 | 16.1 |
| NS-90S | Idemitsu Kosan | 52 | 43 | 5 | 4.5 | 5.3 | 5.7 |
| AC-460 | Idemitsu Kosan | 40 | 33 | 27 | 0.8 | 1.1 | 1.5 |
| Sunthene 4240 | Idemitsu-Sun Oil | 41 | 41 | 18 | 0.5 | 0.9 | 1.6 |
| X140 | Japan Energy | 33 | 23 | 41 | 0.2 | 0.4 | 0.5 |

Examples 24 to 27, and Comparative Examples 18, 19

The same thermoplastic polyester elastomer resin as in Example 1 was used as the base material. To this was added any of different types of mineral process oil shown in Table 8 to prepare molding compositions, and these were molded into flexible resin boots in the same manner as in Example 1. In these, the blend ratio of the oil was 1.5 parts by weight to 100 parts by weight of the thermoplastic elastomer. The boots of Examples 24 to 27 and Comparative Examples 18 and 19 were built into constant velocity joints, and tested for their capability of noise prevention, sealability and durability, in the same manner as in Example 1.

As in Table 8, the boots of Comparative Examples 18 and 19, in which was used process oil having an aromatic content of higher than 13%, were not good in point of noise prevention and durability, when tested under severe condition. Opposed to these, the boots of Examples 24 to 27, in which was used process oil having a low aromatic content, ensured good noise prevention, and their noise-preventing effect lasted long and their durability was good.

INDUSTRIAL APPLICABILITY

The invention applies to constant velocity joint boots for automobiles, and to their production.

The invention claimed is:

1. A method for producing a flexible resin boot formed from a base resin material of a thermoplastic elastomer resin, which comprises;
   preparing a molding material comprising a mixture of a thermoplastic elastomer resin and mineral oil, an aromatic content of said mineral oil being 13% or less, and
   molding the molding material into a flexible resin boot, wherein the flexible resin boot has a large port, a small port and a bellow connecting the large port with the small port.

2. The method as claimed in claim 1, wherein the aromatic content of said mineral oil is 10% or less.

3. The method as claimed in claim 1, wherein a paraffin content of the mineral oil is from 60 to 78% and a naphthene content of the mineral oil is from 20 to 35%.

TABLE 8

| | | Examples | | | | Comparative Examples | |
|---|---|---|---|---|---|---|---|
| | | 24 | 25 | 26 | 27 | 18 | 19 |
| Oil Added | | BJ Oil | PW90 | PA90 | PW380 | Sunthene 4240 | X140 |
| Constituent Components of Oil (%) | Cp | 68 | 71 | 71 | 73 | 41 | 33 |
| | Cn | 25 | 29 | 26 | 27 | 41 | 23 |
| | Ca | 7 | 0 | 3 | 0 | 18 | 41 |
| Noise Prevention | Noise in early stages | ○ | ○ | ○ | ○ | x | x |
| | Duration of noise prevention (min) | >60 | >60 | >60 | >60 | 0 | 0 |
| Sealability | | ○ | ○ | ○ | ○ | ○ | ○ |
| Durability | Time before formation of through-cracks (hr) | 33 | 34 | 33 | 34 | 25 | 22 |
| | for the target time of durability, 30 hours | ○ | ○ | ○ | ○ | x | x |

4. The method as claimed in claim 1, wherein the mineral oil has a number-average molecular weight of from 200 to 2000.

5. The method as claimed in claim 1, wherein the mineral oil has a weight-average molecular weight of from 100 to 2000.

6. The method as claimed in claim 1, wherein the mineral oil has a Z-average molecular weight of from 200 to 3000.

7. The method as claimed in claim 1, wherein the mineral oil has a kinematic viscosity of from 100 to 1000 mm$^{2}$/sec (25° C.) as determined by measurement with a B-type viscometer.

8. The method as claimed in claim 1, wherein from 0.5 to 5 parts by weight of the mineral oil is added to 100 parts by weight of the thermoplastic elastomer resin.

9. The method as claimed in claim 1, wherein the thermoplastic elastomer resin is a thermoplastic polyester elastomer that comprises hard segments composed of an aromatic dicarboxylic acid and a low-molecular-weight glycol, and soft segments having a molecular weight of from 400 to 4000.

10. The method as claimed in claim 9, wherein the aromatic dicarboxylic acid that forms the hard segments is at least one selected from terephthalic acid and naphthalenedicarboxylic acid, and the low-molecular-weight glycol is at least one selected from ethylene glycol, 1,4-butanediol, 1,4-cyclohexanedimethanol, and dimer glycols.

11. The method as claimed in claim 9, wherein the aromatic dicarboxylic acid that forms the hard segments is terephthalic acid, and the low-molecular-weight glycol is 1,4-butanediol.

12. The method as claimed in claim 9, wherein the soft segments are of polyoxytetramethylene glycol, polyoxypropylene glycol or aliphatic polyester-diols.

13. The method as claimed in claim 9, wherein the soft segments are of polyoxytetramethylene glycol, and the polyoxytetramethylene glycol comonomer content of the thermoplastic polyester elastomer falls between 35 and 55% by weight.

14. The method as claimed in claim 9, wherein a degree of swelling of the polyester elastomer in the mineral oil is at most 8% by volume.

15. The method as claimed in claim 9, wherein a degree of swelling of the polyester elastomer in the mineral oil is at most 6% by weight.

16. The method as claimed in claim 1, which further comprises adding a liquid additive containing the mineral oil to hot pellets of a thermoplastic polyester elastomer and mixing and stirring them, thereafter further kneading the resulting mixture and extruding it through an extruder to prepare the molding material.

17. The method as claimed in claim 16, wherein a solid additive is added to and mixed with the mixture of the pellets and the liquid additive by stirring them, and the resulting mixture is then further kneaded and extruded to give the molding material.

18. The method as claimed in claim 16, wherein the pellets and a solid additive are heated and then mixed by stirring them, and thereafter the liquid additive is added to and mixed with the resulting mixture by further stirring them.

19. The method as claimed in claim 16, wherein the liquid additive is, after having been heated, added to and mixed with the pellets by stirring them.

20. The method as claimed in claim 16, wherein the pellets, the liquid additive and a solid additive are all heated, and then mixed together by stirring them to prepare the mixture.

21. The method as claimed in claim 16, wherein the heating temperature is not lower than 60° C.

22. The method as claimed in claim 16, wherein the heating temperature falls between 70 and 100° C.

* * * * *